3,256,361
SULFONE CONTAINING PHENOLIC RESIN COMPOSITIONS
James Harding, Green Brook Township, and William G. Colclough, Jr., Somerville, N.J., assignors to Union Carbide Corporation, a corporation of New York
No Drawing. Filed Mar. 17, 1961, Ser. No. 96,380
13 Claims. (Cl. 260—838)

This invention relates to thermosetting phenolic resin compositions. More particularly, this invention relates to the incorporation of dihydroxydiphenylsulfones or thermosetting condensation products thereof into thermosetting phenolic resins thereby greatly increasing the heat-resistivity of the phenolic resins.

There is a need for thermosetting phenolic resin compositions having improved resistance to heat in view of the rapidly expanding use of such compositions in applications wherein extremely high temperatures are encountered. For example, thermosetting phenolic resin compositions, being relatively light in weight as compared to metals, and being more resistant to heat than compositions based on other types of resins, for instance vinyl resins, are finding increased use as component parts of missiles and of high speed aircraft. As component parts of missiles and of high speed aircraft, these compositions are being subjected to much higher temperatures than ever before.

While presently known thermosetting phenolic resin compositions have shown some ability to resist deformation on being subjected to these temperatures, they have been found to undergo undesirable dimensional changes and loss of strength, particularly when exposed to these high temperatures over prolonged periods of time. Consequently, performability of missiles and of high speed aircraft is frequently impaired by the use of parts which are formed from these compositions.

Another example of an application in which thermosetting phenolic resin compositions are finding increased use is that of insulation in electrical appliances such as radios, television sets and the like. In order to make such appliances more compact, and therefore more convenient to handle, without decreasing their electrical power potential, it is necessary to concentrate more electrical power potential in a more compact unit. As a result, the component parts thereof are subjected to higher temperatures than ever before when such appliances are in operation. Thermosetting phenolic resin compositions which are presently available for use as insulation in such appliances have been found deficient in that they frequently undergo undesirable dimensional changes at the relatively high temperatures developed in such appliances thereby interfering with the operation thereof.

The present invention provides for thermosetting phenolic resin compositions which have excellent heat-resistivity and therefore are particularly desirable for use in applications wherein resistivity to heat is essential. The compositions of this invention can be formed into shaped structures and successfully used as parts for missiles and high speed aircraft as they undergo none of the undesirable dimensional changes attributed to presently known thermosetting phenolic resin compositions. In addition, the compositions of this invention, by reason of their relatively light weight and by reason of their resistivity to heat, i.e., retention of physical strengths on high temperature aging, are preferred over ceramics and metals in applications wherein relative lightness in weight and heat-resistivity are desired.

The thermosetting phenolic resin compositions of this invention comprise a thermosetting condensation product of a phenol and an aldehyde; and a dihydroxydiphenylsulfone or thermosetting condensation products thereof. Particularly desirable thermosetting phenolic resin compositions, for purposes of this invention, are those wherein at least one of the materials, described in the preceding sentence, is capable per se of thermosetting under the influence of heat to an infusible product.

The dihydroxydiphenylsulfones, thermosetting condensation products of dihydroxydiphenylsulfones, or mixtures thereof are present in the compositions of this invention in a heat-stabilizing amount, that is in an amount sufficient to stabilize the compositions against the effects of heat. Generally, the compositions of this invention contain from aobut 3 percent by weight to about 70 percent by weight and preferably from about 20 percent by weight to about 50 percent by weight, based on the combined weight of the condensation product of a phenol and an aldehyde, and the dihydroxydiphenylsulfone in any of its described forms.

In those instances wherein the condensation product of a phenol and an aldehyde is a liquid, the weight thereof is based upon its solids content. The solids content is determined according to the following procedure: A 1.5 gram sample of the condensate is heated in an oven, which is at 135° C., for three hours. The residue is then cooled to room temperature, i.e. 23° C. and weighed. The numerical weight of the residue is divided by the numerical weight of the sample and the result multiplied by 100. The result obtained indicates the percent weight per 1.5 grams of liquid condensate.

Suitable condensation products of a phenol and an aldehyde, for purposes of this invention, are the condensates, generally acid catalyzed, referred to as "novolac resins" and condensates, generally alkaline catalyzed, referred to as "resole resins."

Condensates, referred to as "novolac resins" are usually prepared by condensing a phenol and an aldehyde in the presence of an acid such as oxalic acid, sulfuric acid and the like or in the presence of a metal salt of an acid such as zinc acetate; wherein the aldehyde is present in the reaction mixture in less than stoichiometric amounts. Novolac resins are generally fusible, brittle grindable resins which can be converted to the infusible state by the addition thereto of a methylene generating agent such as hexamethylenetetramine.

Condensates generally referred to as "resole resins" are usually prepared by condensing a phenol and an aldehyde in the presence of a base such as an alkali metal oxide or hydroxide or an alkaline earth metal oxide or hydroxide, as for example, sodium hydroxide, potassium hydroxide, calcium hydroxide, calcium oxide and the like, or an amine, or ammonia; wherein the aldehyde is present in the reaction mixture in greater than stoichiometric amounts. The resoles can be either liquid resins, soft resins having a low melting point or hard, brittle grindable resins and are heat-hardenable per se to the infusible state, that is, they will thermoset to infusible products under the influence of heat.

Illustrative of suitable phenols which can be condensed with an aldehyde to produce condensation products of a phenol and an aldehyde whose heat-resistance can be significantly improved by the addition thereto of a dihydroxydiphenylsulfone in any of its previously described forms, can be noted: phenol; dihydric phenols such as resorcinol; meta-substituted phenols such as the meta-alkylated phenols exemplary of which are m-cresol, m-ethylphenol, m-n-propylphenol, m-isopropylphenol, m-n-butyl phenol, m-sec-butyl phenol, m-tert-butyl phenol, m-amyl phenol and other like phenols, particularly those wherein the alkyl substituent contains from 1 to 6 carbon atoms inclusive, as well as the commercially available meta-cresol which contains small amounts of both the para and the ortho isomers; meta-substituted alkoxy phenols such as m-methoxy phenol, m-ethoxy phenol, m-n-propoxy phenol, m-amyl phenol and the like particularly those wherein the alkoxy group contains from 1 to 6 carbon atoms inclusive; meta-halogenated phenols such as m-chloro-phenol, m-bromo-phenol and the like.

Examples of aldehydes which can be condensed with the phenols listed above to produce the phenol-aldehyde condensates are: formaldehyde in any of its available forms, i.e., formalin, para-formaldehyde; furfural and the like.

For a detailed discussion of condensates produced from a phenol and an aldehyde and methods for the production thereof, reference is made to the books: "Phenoplasts" by T. S. Carswell, published in 1947 by Interscience Publishers and "Chemie der Phenolharze" by K. Hultzsch, Springer Verlag 1950, which are incorporated herein by reference.

Exemplary of suitable "sulfones" which are added to condensates of a phenol and an aldehyde to produce the compositions of this invention are those having the formula:

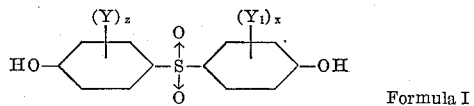

Formula I wherein each Y and each $Y_1$, which can be the same or different, are alkyl radicals such as methyl, ethyl, n-propyl and the like, preferably alkyl radicals containing from 1 to 4 carbon atoms inclusive; or halogen atoms, i.e., chlorine, bromine, iodine, or fluorine; or alkoxy radicals such as methoxy, ethoxy, n-propoxy and the like, preferably alkoxy radicals containing from 1 to 4 carbon atoms inclusive; $z$ and $x$ which can be the same or different are integers each of which has a value of 0 to 4 inclusive; wherein in the compounds having the structure represented by Formula I at least two of the four positions ortho to the hydroxyl groups are unsubstituted.

Specific compounds coming within the purview of Formula I are the following: bis-(4-hydroxyphenol)-sulfone, 5′-methyl-4,4′-dihydroxydiphenylsulfone, 3′-chloro-4,4′-dihydroxydiphenylsulfone, 3 - methoxy-4,4′-dihydroxydiphenylsulfone. Also suitable is the commercially available bis-(4-hydroxyphenyl)-sulfone which contains some 2,4′-dihydroxydiphenylsulfone.

Also suitable for purposes of this invention are the thermosetting condensation products produced by condensing a compound having the structure represented by Formula I having at least two unsubstituted ortho positions as previously described, with an aldehyde as for example formaldehyde, furfural and the like in the presence of a base such as those noted as suitable for the preparation of the "resole" resins previously defined. Among suitable thermosetting condensation products can be noted those produced by condensing bis-(4-hydroxyphenyl)-sulfone with formaldehyde. Specific condensation products of bis-(4-hydroxyphenyl)-sulfone and formaldehyde include, among others, compounds having the formula:

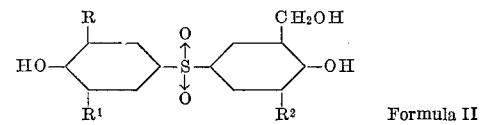

Formula II wherein R, $R^1$ and $R^2$ which can be the same or different, are hydrogen or methylol radicals, that is, —$CH_2OH$ radicals.

Dihydroxydiphenylsulfones having a structural formula coming within the purview of Formula I can be conveniently prepared according to the procedures described in a book by Chester M. Suter, "The Organic Chemistry of Sulfur" published by John Wiley & Sons, copyright 1944, which is incorporated herein by reference, at pages 695–701 thereof.

Compounds having a structural formula coming within the purview of Formula II can be conveniently prepared by heating at temperatures of about 75° C.–85° C. for a period of time of about 3 hours, a mixture containing bis-(4-hydroxyphenyl)-sulfone, formaldehyde, sodium hydroxide and water wherein the sodium hydroxide is present in equimolar amounts based on the amount of bis-(4-hydroxyphenyl)-sulfone and the number of mols of formaldehyde will be in the range of 1 to 4 mols and higher if so desired, per mol of bis-(4-hydroxyphenyl)-sulfone. The number of mols of formaldehyde used per mol of bis-(4-hydroxyphenyl)-sulfone controls the number of methylol groups in the final product. At the end of the 3 hour period, acid such as hydrochloric acid is added to the reacted mixture in order to neutralize the alkaline catalyst. The product which separates out of the aqueous layer is recovered by decanting off the aqueous layer. A detailed description of suitable processes for preparing compounds coming within the purview of Formula II is to be found subsequently in this application.

For purposes of this invention the thermosetting "sulfones" produced by condensing bis-(4-hydroxyphenyl)-sulfone with formaldehyde as described are particularly preferred as the phenolic compositions produced on adding these "sulfones" to condensates of a phenol and an aldehyde will thermoset to infusible products in a very short period of time on being subjected to elevated temperatures, generally on the order of about 150° C. to about 200° C. without the use of a catalyst. Consequently, such compositions can be molded into desired structures using molding cycles of short duration.

The compositions of this invention can be formulated by a number of convenient methods. A particularly preferred method of preparation is one wherein a condensate of a phenol and an aldehyde is prepared in a still and the desired "sulfone" added directly thereto just prior to the dehydration of the condensate. As an illustration of this preferred method, a composition hereinafter referred to as Composition A was prepared as follows: Into a still there was charged 150 parts by weight of formalin (37%) and 100 parts by weight phenol. Three parts by weight barium hydroxide were then added and the contents in the still brought to 80° C. and maintained at this temperature for 2 hours while under a pressure of 330 mm. of Hg. At the end of the two hour period, the contents of the still were neutralized and then brought to a pH of 3.50 to 4.50 by the addition thereto of phosphoric acid (75%). Thereafter, 5.5 parts by weight of hexamethylenetetramine were added into the still, followed by the addition of 70 parts by weight of bis-(4-hydroxyphenyl)-sulfone. The contents of the still were vacuum dehydrated up to a temperature of about 90° C. to about 100° C. under a pressure of about 25–75 mm. of Hg. The composition so obtained upon being cooled to room temperature, about 23° C., was heat-hardenable, that is, capable of thermosetting to an infusible product, and grindable.

As another convenient method of formulating the compositions of this invention, a condensate of a phenol and an aldehyde can be compounded with a suitable "sulfone" on a two-roll mill to form a homogeneously blended composition.

When the condensate of a phenol and an aldehyde which is to be admixed with a "sulfone" is a so-called novolac resin and the "sulfone" per se is not thermosetting, it is customary to incorporate into the resultant composition a methylene-generating compound which will insure that the composition, when heated, will thermoset to an infusible product. Illustrative of such methylene generating compounds are hexamethylenetetramine, anhydro-formaldehyde aniline, paraform and the like. In those instances wherein the composition contains a material which is thermosetting per se, that is, wherein either the condensate of a phenol and an aldehyde, or the "sulfone" is heat-hardenable, no such methylene-generating compounds are generally used. A discussion of suitable methylene-generating compounds is to be found in the book by T. S. Carswell previously noted.

When used, the methylene generating compounds are employed in amounts of from about 5 percent by weight to about 20 percent by weight, preferably about 10 percent by weight based on the weight of the condensate of a phenol and an aldehyde. More than 20 percent by weight can be used but this is economically undesirable.

Also, if so desired, any of the conventional catalysts used to promote the thermosetting of phenolic resins can be used, in all instances, as an aid in thermosetting compositions of this invention. These catalysts, when employed, are used in amounts of from about 1 percent by weight to about 20 percent by weight, preferably from about 2 percent by weight to about 6 percent by weight based on the combined weight of the "sulfone" and the condensate of a phenol and an aldehyde. Exemplary of such catalysts are the alkali metal hydroxides such as sodium hydroxide, potassium hydroxide and the like; the alkaline earth metal hydroxides such as calcium hydroxide and the like; alkaline earth metal oxides such as calcium oxide and the like.

Compositions of this invention can also contain various other additives, as are well known in the art. Illustrative of such additives, are the so-called fillers which are inert materials usually added to phenolic resin compositions in order to improve the physical characteristics thereof. Illustrative of such fillers are the following: the mineral fillers such as asbestos, wollastonite, mica, silica, graphite, and the like; and organic fillers such as woodflour, cotton flock, polyamide fibers, polyester fibers, graphite cloth, graphite fibers and the like.

Fillers, when used, are generally employed in amounts of from about 15 percent by weight to about 300 percent by weight based on the combined weight of the "sulfone" and the condensate of a phenol and an aldehyde.

Other materials, commonly added to phenolic resin compositions, are lubricants such as carnauba wax, candelilla wax, zinc stearate and the like; and colorants such as titanium dioxide and the like.

As previously pointed out, the compositions of this invention have particular utility as compositions which can be molded into articles of desired shape and the articles so produced used in applications wherein excellent resistivity to heat is required. The exact conditions under which compositions of this invention can be molded will, of course, vary depending in part upon the particular composition being molded and the configuration and size of the article being formed. As a general rule, suitable molding temperatures range from about 150° C. to about 200° C.

In formulating compositions of this invention, various compounding techniques can be used. Among such techniques can be noted the following:

(1) Dry blending a condensate of a phenol and an aldehyde, a "sulfone" and any desired additive in a ball mill, drum tumbler, or in a ribbon blender.

(2) Fluxing a condensate of a phenol and an aldehyde, a "sulfone" and any desired additive in a differential speed mill, a Banbury mixer or in an extruder, cooling the fluxed composition to room temperature, about 23° C. and grinding the fluxed composition to the desired particle size.

(3) Forming an organic solution or an aqueous solution of a mixture of a condensate of a phenol and an aldehyde and a "sulfone," impregnating a filler such as asbestos with the solution, drying the impregnated filler and dicing the impregnated filler to the desired size.

(4) Forming a water slurry of a condensate of a phenol and an aldehyde, a "sulfone" and any desired additive, dropping the slurry onto a screen of a Fourdrinier paper making machine, drying the slurry to form a mat and then chopping the mat into small pieces of desired size.

In the examples which follow and illustrate the present invention without limiting the scope thereof in any manner, each composition noted contained 40 percent by weight of a "sulfone" and a condensate of a phenol and an aldehyde, based on the total weight of the composition. The percent by weight "sulfone" in the 40 percent combined weight of the "sulfone" and the condensate of a phenol and an aldehyde is noted in each example.

Each composition listed in the examples was prepared as follows:

To a mixture of a condensate of a phenol and an aldehyde and a "sulfone," which mixture made up 40 percent by weight of each composition, there was added 4.0 parts by weight of calcium hydroxide, 1.5 parts by weight of calcium stearate, and 54.5 parts by weight of a filler and the resultant mixture dry-blended for 15 minutes in a rotating drum. The blended mixture was then compounded on a two-roll, differential speed mill wherein the temperature of the front roll was at 95° C. and the temperature of the back roll was at 140° C. Rolling time for each composition in the two-roll, differential speed mill was 70 seconds. Each composition was taken off the mill in the form of a sheet, cooled to room temperature, about 23° C., ground to an average particle size of 16 mesh in an Abbé mill and then molded into bars having the following dimensions: ¼" by ½" by 5". The molding operation was conducted at a temperature of 180° C. and at a pressure of 2,600 p.s.i. The molding cycle took 5 minutes. Once formed, each bar was baked for 16 hours while maintained at a temperature of 130° C.

Bars so formed were tested for percent weight loss after being heat aged and were also tested for flexural strength according to ASTM D790–49T.

The condensates of a phenol and an aldehyde were combined with a desired "sulfone" in a differential speed, two roll mill whose front roll was at a temperature of 95° C. and its rear roll was at a temperature of 140° C.; or combined therewith in a "still" just prior to the dehydration of the condensate of a phenol and aldehyde as previously described for the preparation of Composition A. The procedure used in each instance as well as the amount of sulfone added are noted in the examples which follow.

The "sulfone" noted in Examples 1–11 inclusive was bis-(4-hydroxyphenyl)-sulfone.

The "sulfone" noted in Example 12 was a thermosetting condensation product of bis-(4-hydroxyphenyl)-sulfone and formaldehyde and was prepared as follows: 1500 grams of bis-(4-hydroxyphenyl)-sulfone and 148.5 grams of paraform were dissolved in 750 grams of butanol. The solution was heated to reflux (about 128° C.) under atmospheric pressure and the evolved water was collected in a Dean-Stark trap. The refluxing was continued until 119 grams of water had been collected. The butanol was distilled off at atmospheric pressure to a residue temperature of 150° C. The condensation product so produced was cooled to room temperature, about 23° C., and ground into small particles.

The "sulfone" noted in Example 13 was a dimethylolated bis-(4-hydroxyphenyl)-sulfone having the formula:

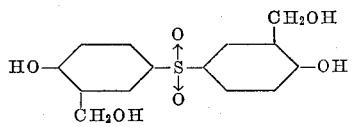

This compound was prepared as follows: Into a 3-liter, 3-neck flask equipped with an agitator, and thermometer there was charged 3.0 mols of bis-(4-hydroxyphenyl)-sulfone and 12.0 mols of formalin (37%). An aqueous solution of 6.0 mols of sodium hydroxide (50%) in 480 grams of water was added slowly into the flask while the contents of the flask were being constantly mixed. The mixture was then heated to 80° C. and held at 80° C. for 3 hours. After the 3 hour period, the contents of the flask were cooled to room temperature, about 23° C. A mixture of 584 grams of hydrochloric acid (37%) and 584 grams of water were then added into the flask over a period of thirty minutes while the contents of the flask were maintained below about 25° C. The contents of the flask were agitated for one hour after which time agitation was stopped and the methylolated bis-(4-hydroxyphenyl-sulfone so produced allowed to settle to the bottom of the flask. The aqueous layer was decanted off and the methylolated bis-(4-hydroxyphenyl)-sulfone recovered was a solid capable per se of thermosetting under the influence of heat to an infusible product.

The "sulfone" noted in Example 14 was a trimethylolated bis-(4-hydroxyphenyl)-sulfone having the formula:

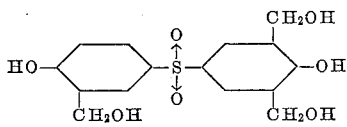

This compound was prepared as follows:

Into a 3-gallon laboratory reactor equipped with an agitator, recording thermocouple and jacket, there was charged 3269.0 grams (20.8 mols) of sodium hydroxide (24.45%) and 2600.0 grams (10.4 mols) of bis-(4-hydroxyphenyl)-sulfone and the mixture held at 65° C. until solution was complete. When all of the bis-(4-hydroxyphenyl)-sulfone had dissolved, 5059.6 grams (62.4 mols) of formalin (37%) was added into the reactor. The mixture was heated to 60° C. and held at 60° C. for 25 hours. Analysis for free formaldehyde at this point and after the mixture stood for 17 hours at room temperature showed that consumption of formaldehyde has virtually ceased. There was then added into the flask 1248 grams of a 50 percent by weight aqueous solution of sodium hydroxide. The resultant mixture was heated to 70° C. and held at 70° C. for 2½ hours. The contents of 3-gallon reactor were cooled to room temperature, about 23° C. and neutralized by adding thereto hydrocloric acid (37.5%) diluted with an equal weight of water. The methylolated bis-(4-hydroxyphenyl)-sulfone so produced was allowed to settle to the bottom of the reactor. The aqueous layer was decanted off and the methylolated bis-(4-hydroxyphenyl)-sulfone recovered was a solid capable per se of thermosetting under the influence of heat to an infusible product.

Condensates of a phenol and an aldehyde noted in the examples were prepared as follows:

*Condensate I.—Alkaline catalyzed resin*

Into a still there was charged 150 parts by weight of formalin (37%) and 100 parts by weight of phenol. To this mixture there was then added 3 parts by weight of barium hydroxide. The resultant mixture was heated to 80° C. and refluxed at 80° C. for 2 hours under a pressure of 330 mm. of Hg. The contents of the still were neutralized and then brought to a pH of 3.50–4.50 with phosphoric acid (75%). At this point 5.5 parts by weight of hexamethylenetetramine were added into the still and the contents thereof dehydrated up to a temperature of 80° C.–100° C. while under a pressure of 75 mm. of Hg. The "resole" resin so produced was discharged into a pan and cooled to room temperature, about 23° C. The resin was hard, grindable, and had a melting point of 85° C.–95° C.

*Condensate II.—Alkaline catalyzed resin*

Into a still there was charged 150 parts by weight of formalin (37%) and 100 parts by weight phenol. To this mixture there was then added 3 parts by weight of sodium hydroxide. The resultant mixture was heated to 80° C. and refluxed at 80° C. for 2 hours under a pressure of 330 mm. of Hg. The contents of the still were neutralized, brought to a pH of 3.5–3.8 with boric acid (75%) and then dehydrated at a temperature of 80° C.–100° C. while under a pressure of 75 mm. of Hg. The "resole" resin so produced was discharged into a pan and cooled to room temperature, about 23° C. The resin was hard, grindable and had a melting point of 85° C.–95° C.

*Condensate III.—Alkaline catalyzed resin*

Into a still there was charged 150 parts by weight of formalin (37%) and 100 parts by weight of phenol. To this mixture there was then added 3 parts by weight of barium hydroxide. The resultant mixture was heated to 80° C. and refluxed at 80° C. for 2 hours under a pressure of 330 mm. of Hg. The contents of the still were neutralized and then brought to a pH of 3.50–4.50 with phosphoric acid (75%). At this point 5.5 parts by weight of hexamethylenetetramine were added into the still followed by an addition of 30 parts by weight of aniline. The contents of the still were dehydrated at a temperature of 80° C.–100° C. while under a pressure of 75 mm. of Hg. The "resole" resin so produced was discharged into a pan and cooled to room temperature, about 23° C. The resin was hard, grindable and had a melting point of 85° C.–95° C.

*Condensate IV.—Acid catalyzed resin*

A mixture of 100 parts by weight of phenol and 73 parts by weight formalin (37%), adjusted with oxalic acid to a pH of 1.0–1.1, was vacuum refluxed in a still at 90° C. to cloudiness. The temperature was gradually increased to 120° C. by steady application of pressure and reflux continued for two hours at 120° C. At the end of this two hour period, pressure was released and the system was dehydrated until the residue temperature reached 160° C. The resin so produced was discharged into a pan and air cooled to room temperature, about 23° C. The resin was hard, grindable and had a melting point of 105° C.–110° C.

*Condensate V.—Acid catalyzed resin*

A mixture of 100 parts by weight of phenol and 69 parts by weight formalin (37%), adjusted with oxalic acid to a pH of 1.0–1.1, was vacuum refluxed, in a still, at 90° C. to cloudiness. The temperature was gradually increased to 120° C. by steady application of pressure and reflux continued for two hours at 120° C. At the end of this two hour period, pressure was released and the system was dehydrated until the residue temperautre reached 160° C. The resin so produced was discharged into a pan and air cooled to room temperature, about 23° C. The resin was hard, grindable and had a melting point of 85° C.–95° C.

Condensate VI.—Alkaline catalyzed resin

A mixture of 100 parts by weight of phenol, 90 parts by weight formalin (37%) and 5.6 parts by weight of hexamethylenetetramine was vacuum refluxed at 80° C. for 40 minutes, vacuum dehydrated under a pressure of 110 mm. of Hg. and at a temperature of 90° C. and held at 90° C. until a 1 gram sample when heated at 150° C. had a gel time of 95–105 seconds. At this point the resin so produced was discharged into a pan and cooled to room temperature, about 23° C. The resin was hard, grindable and had a gel time of 65–85 seconds at 150° C.

Condensate VII.—Alkaline catalyzed trimethylol phenol

A mixture consisting of 940 grams (10 mols) phenol, 450 grams (15 mols) paraformaldehyde and 1215 grams (15 mols) of 37 percent aqueous formaldehyde was cooled to 10° C.–15° C. in an ice bath and 280 grams (5 mols) of reagent grade calcium oxide were added at such a rate that the reaction mass temperature did not exceed 30° C. Agitation was continued for two hours, 500 ml. of water were added and the mixture agitated 15 more hours at room temperature. The solution, which was entirely clear and homogeneous at this point, was re-cooled to below 20° C. then neutralized by slowly adding a solution consisting of 490 grams (5 mols) $H_2SO_4$ in 500 ml. of water. The temperature of the reaction mixture was maintained below 30° C. during this addition. The pH at this point was 5–6. The calcium sulfate was filtered off and washed with water. The filtrates were combined and vacuum concentrated (pressure 5–10 mm.) at room temperature to a final weight of 2125 grams. The amber-colored, moderately viscous solution contained about 25 percent water (by Karl Fischer titration) and about 75 percent trimethylolphenol. The solids content of this resin, determined as previously described, was 60 percent by weight.

| Composition | Flexural Strength ASTM-D790-49T (p.s.i.) |
|---|---|
| Example 14— | |
| As molded | 6,330 |
| After baked 16 hours at 120° C. | 7,030 |
| After baked 16 hours at 120° C. and then aged 7 days at 260° C. | 3,320 |
| Control 4— | |
| As molded | 5,580 |
| After baked 16 hours at 120° C. | 6,470 |
| After baked 16 hours at 120° C. and then aged 7 days at 260° C. | 770 |

| | Dimensional change in Length of Molded Bars, 5 inches Original Length |
|---|---|
| Example 14— | |
| After baked for 16 hours at 120° C. and then aged at 260° C. for: | |
| 3 days | −.013 |
| 4 days | −.013 |
| 5 days | −.013 |
| 6 days | −.013 |
| 7 days | −.013 |
| Control 4— | |
| After baked for 16 hours at 120° C. and then aged at 260° C. for: | |
| 3 days | +.027 |
| 4 days | +.014 |
| 5 days | −.004 |
| 6 days | −.031 |
| 7 days | −.051 |

| | Percent Weight Loss |
|---|---|
| Example 14— | |
| After baked for 16 hours at 120° C. and then aged at 260° C. for: | |
| 3 days | 3.5 |
| 4 days | 4 |
| 5 days | 4.5 |
| 6 days | 5 |
| 7 days | 5.5 |
| Control 4— | |
| After baked for 16 hours at 120° C. and then aged at 260° C. for: | |
| 3 days | 6 |
| 4 days | 9 |
| 5 days | 12.5 |
| 6 days | 15.5 |
| 7 days | 18 |

| Example | Condensate | Sulfone Percent | Sulfone Where Added | Filler | Percent Wt. Loss After 16 Hrs. at 345° C. | Percent Wt. Loss After 300 Hrs. at 260° C. |
|---|---|---|---|---|---|---|
| Control 1 | 2 parts by wt. Condensate I per 1 part by wt. Condensate IV. | 0 | | Asbestos | 20 | 13.6 |
| Control 2 | 2 parts by wt. Condensate I per 1 part by wt. Condensate IV. | 0 | | Silica | 37 | |
| Control 3 | 2 parts by wt. Condensate I per 1 part by wt. Condensate IV. | 0 | | Wollastonite | (¹) | |
| Example 1 | Condensate I | 33 | Rolls | Asbestos | | 6.8 |
| Example 2 | Condensate II | 33 | do | do | | 8.5 |
| Example 3 | Condensate I | 33 | Still | do | | 4.8 |
| Example 4 | Condensate I | 5 | do | do | 16 | |
| Example 5 | Condensate I | 10 | do | do | 13 | |
| Example 6 | Condensate I | 20 | do | do | 10 | |
| Example 7 | Condensate I | 50 | do | do | 10 | |
| Example 8 | Condensate VII | 50 | do | do | 11 | |
| Example 9 | Condensate VI | 33 | do | do | 13 | |
| Example 10 | Condensate III | 33 | do | do | 9 | |
| Example 11 | Condensate I | 33 | do | Silica | 11 | |
| Example 12 | Condensate I | 33 | Rolls | Asbestos | 10 | |
| Example 13 | Condensate IV | 54 | do | do | 10.2 | |
| Example 14 | Condensate V | 49 | do | do | | |
| Control 4 | Condensate V plus 10 percent by weight of hexamethylene-tetramine based on the weight of Condensate V. | 0 | | do | | |

¹ Burnt to ash.

In order to further demonstrate the excellent heat resistivity of the compositions of this invention, bars having dimensions of ¼ inch by ½ inch by 5 inches were molded from the composition described in Example 14 and from the composition described in Control 4 in a manner as previously described. These bars were then subjected to tests noted below. As the results of the tests indicate, the composition described in Example 14, which contains a "sulfone" has significantly better heat-resistance than the composition described in Control 4 which does not contain a "sulfone."

The compositions of this invention, in addition to being particularly desirable for use as molding materials, can also be dissolved in suitable solvents such as ethanol, methylethyl ketone and the like and used as varnishes in the production of laminated structures.

What is claimed is:

1. A thermosetting composition comprising a thermosetting precondensate of a phenol and an aldehyde said precondensate being free of sulfur atoms; and a sulfone which is a member selected from the group consisting of (I) a compound having the formula:

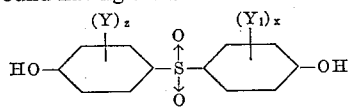

wherein each Y and each $Y_1$ are selected from the group consisting of alkyl radicals containing from 1 to 4 carbon atoms inclusive, alkoxy radicals containing from 1 to 4 carbon atoms inclusive and halogen atoms and $z$ and $x$ are integers having values of 0 to 4 inclusive with the further limitation that at least two of the four positions ortho to the hydroxyl groups of said sulfone are unsubstituted, and (II) thermosetting condensation products of (I) and an aldehyde selected from the group consisting of formaldehyde and furfural wherein said sulfone is present in said composition in an amount of from about 3 percent by weight to about 70 percent by weight based on the combined weight of said precondensate and said sulfone.

2. The thermoset product of the composition defined in claim 1.

3. A thermosetting composition as defined in claim 1 wherein the said sulfone is present in said composition in an amount of from about 20 percent by weight to about 50 percent by weight based on the combined weight of said precondensate and said sulfone.

4. The thermoset product of the composition defined in claim 3.

5. A thermosetting composition as defined in claim 1 wherein the sulfone is bis-(4-hydroxyphenyl)-sulfone.

6. A thermosetting composition as defined in claim 1 wherein the said sulfone has the formula:

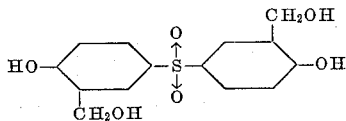

7. A thermosetting composition as defined in claim 1 wherein the said sulfone has the formula:

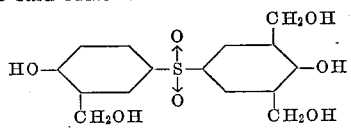

8. A thermosetting composition comprising a thermosetting precondensate of a phenol and aldehyde, said precondensate being free of sulfur atoms; and a sulfone which is the thermosetting condensation product of bis(4-hydroxyphenyl)-sulfone and formaldehyde in an amount of from about 3 percent by weight to about 70 percent by weight based on the combined weight of said precondensate and said sulfone.

9. The thermoset product of the composition defined in claim 8.

10. A thermosetting composition as defined in claim 8 wherein the said phenol is phenol.

11. A thermosetting composition as defined in claim 8 wherein the said aldehyde of the precondensate is formaldehyde.

12. A thermosetting composition comprising a thermosetting precondensate of phenol and formaldehyde; and bis(4-hydroxyphenyl)sulfone in an amount of from about 3 percent by weight to about 70 percent by weight based on the combined weight of said precondensate and said sulfone.

13. The thermoset product of the composition defined in claim 12.

References Cited by the Examiner

UNITED STATES PATENTS

| 1,972,797 | 9/1934 | Schafer | 260—49 |
| 2,046,318 | 7/1936 | Brubaker | 260—51 X |
| 2,079,606 | 5/1937 | Drummond et al. | 260—51 X |
| 2,728,741 | 12/1955 | Simon et al. | 260—49 X |

FOREIGN PATENTS

| 464,022 | 3/1950 | Canada. |
| 416,191 | 9/1934 | Great Britain. |
| 458,028 | 12/1936 | Great Britain. |

WILLIAM H. SHORT, *Primary Examiner.*

HAROLD N. BURSTEIN, *Examiner.*

A. D. RICCI, J. C. MARTIN, *Assistant Examiners.*